March 13, 1934. H. C. ODENKIRK 1,951,253
SANITARY AND SELF CLEANSING TRAP
Filed Dec. 2, 1931
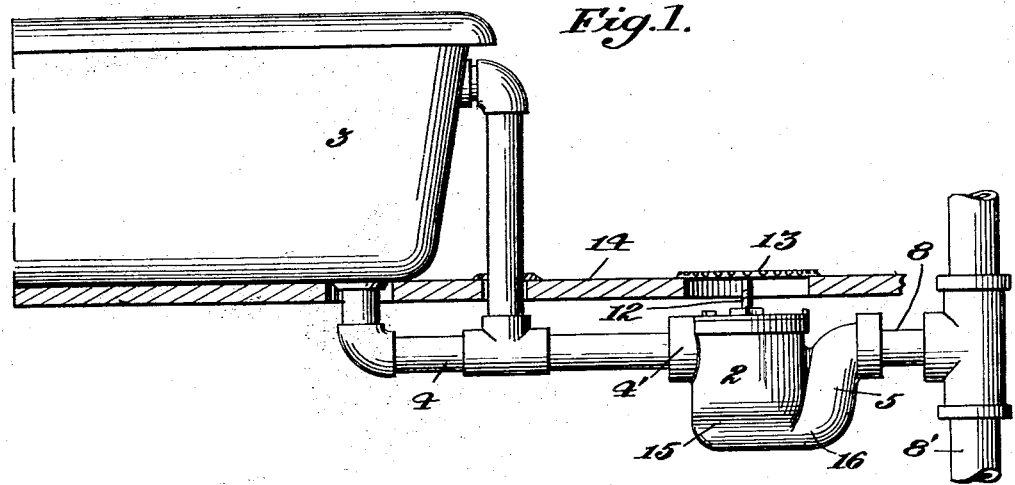
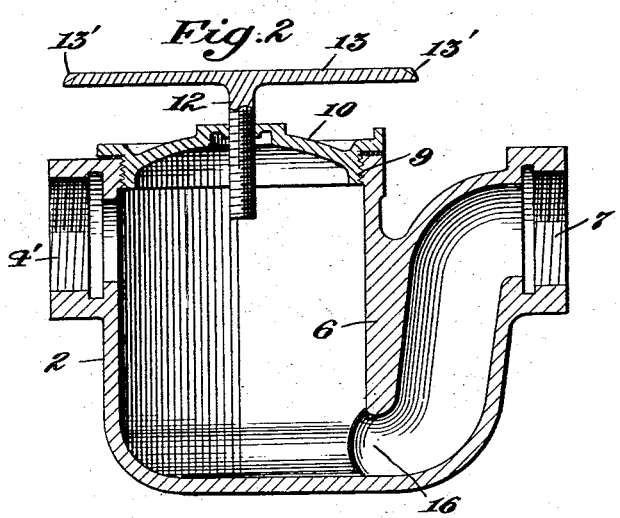
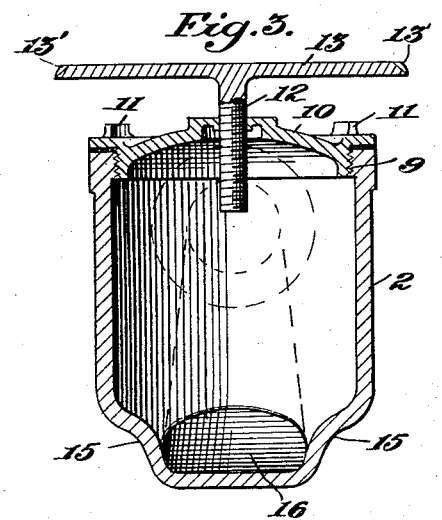
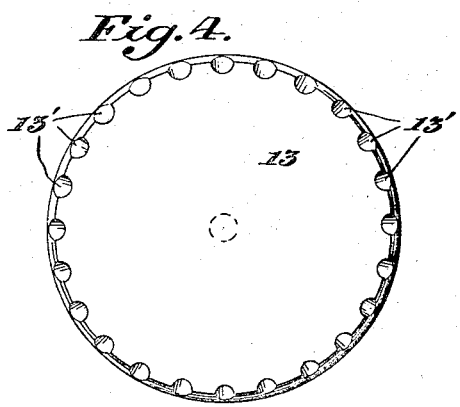
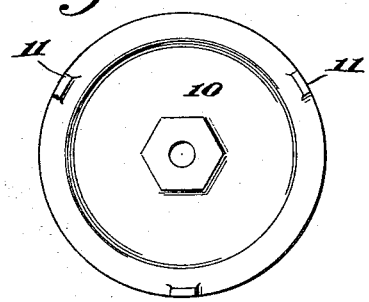
Inventor:
Harry C. Odenkirk,
by Jas. L. Skidmore
Atty.

Patented Mar. 13, 1934

1,951,253

UNITED STATES PATENT OFFICE 1,951,253

SANITARY AND SELF-CLEANSING TRAP

Harry C. Odenkirk, Cleveland, Ohio

Application December 2, 1931, Serial No. 578,556

3 Claims. (Cl. 182—18)

This invention pertains to a novel and improved sanitary self-sealing trap especially designed to be utilized in connection with bath tub waste drainage.

The prime object of the invention is to provide a simple, durable, economical, compact and thoroughly efficient sanitary self-sealing trap of the drum type of construction that is suitably connected to the waste pipe of a bath tub.

Another object of the invention is to furnish an improved trap of such compact and reduced dimensions that it may be readily installed in small limited quarters, and at the same time effectively serve its purpose.

A further object of the invention is to so construct my novel trap that an enlarged and sloping outlet is formed in line with the entire bottom thereof with the sides of the trap tapering near its bottom portion to make it positively self-cleaning; that there are no corners formed for any collection of dirt or other kinds of substances; that means are provided for furnishing an adjustable cover and the shallowing of the trap making it much easier to install, and an adjustable plate cover which permits leeway in the adjustability of the trap and at the same time serves as a flat and smooth cover for the floor of the bath room.

The foregoing and such other objects as may appear from the ensuing description are accomplished by the construction, arrangement, formation, location and combination of the several parts hereinafter more fully described, illustrated in the accompanying drawing and more particularly pointed out in the claims appended hereto, it being understood that slight changes in the precise form, proportions and minor details of the construction may be resorted to without departing from the spirit or sacrificing any of the advantages of the invention.

In the accompanying drawing which forms a part of the specification, it will be seen that:

Figure 1 is a view in side elevation showing the improved means embodying my invention in connection with a bath tub.

Figure 2 is a sectional elevation of the trap proper removed from its connections showing the floor plate secured thereto.

Figure 3 is a cross section of the device such as is shown in Fig. 2.

Figure 4 is a plan of the trap cover, and

Figure 5 is a plan of the floor plate.

In the embodiment of my invention as illustrated it will be seen by reference to Fig. 1, that the numeral 2 designates the trap which is connected to the waste outlet of a bath tub 3, by a threaded pipe connection 4, that is securely fitted to the threaded inlet 4', formed integral with the cylindrical body portion of the trap, at one side thereof, and substantially diametrically opposite to said inlet is formed the outlet or discharge member 5 of the trap, said outlet or discharge member being integrally and compactly connected to the main body portion at an angle with relation to the upright body portion of the trap, by the upright thickened portion 6 of the trap which constitutes a strengthening and reinforcing portion thereof, said outlet terminating with a threaded portion 7. Fitted to the said portion 7 of the outlet is a threaded pipe connection 8 that leads to and is connected with the waste pipe 8', leading to a sewer.

It will be perceived that by this precise construction of trap formed from a single piece of metal that may be coated with any desirable rust-proof coating, but is preferably formed from a single piece of galvanized cast iron, the upper end of the main body portion being screw-threaded internally at 9 for the reception of a screw-threaded cover member 10 of any suitable or desirable metal with its peripheral portion terminating in vertical alinement with the outer surface of the trap, said cover member being provided with a plurality of upward extensions 11, so that by placing a blunt piece of material against one of the extensions, so as to tap it with a hammer, the resulting jar removes the cover much easier and quicker, especially after the cover has been sealed for a long period of time, since the jar breaks the seal more readily than a pull with a wrench. The cover member 10 is screw-threaded centrally therethrough for the reception of the depending centrally disposed screw-threaded portion 12 of the floor plate 13 formed from a single piece of any suitable or desirable metal with a smooth upper surface and its periphery being provided with a series of notches 13' formed in the metal to permit a small piece of wood, or other suitable material against one of the notches and tapping it with a hammer, thereby tightening or loosening said plate, thus providing means for the proper and suitable or desirable adjustment of the trap between the ceiling and the floor 14 upon which the lower face of the plate is seated.

It will be readily observed that by this construction of trap the inlet and outlet connections with relation to the main body portion are so reduced that a complete trap is formed in such a compact and reduced size that it can be readily installed in houses or buildings where there is but a small and limited space between them for proper installations.

Owing to the formation of the main body portion of the trap with its inner smooth vertical wall extending downwardly to a point in horizontal alinement with the upper portion of its outlet, and without any obstruction or movable parts, partitions and additions for its seal, and with its inwardly sloping wall 15 at its bottom portion, and terminating with a flat bottom, which is slightly downwardly inclined to the widened outlet 16, said outlet extending the entire width of the bottom of the trap and gradually inclined upwardly and inwardly to the discharge end thereof, it will be evident that the trap is entirely free of all corners for any collection of sediment of any kind and that it is self-cleansing, hence prevents any liability of its discharge being clogged or otherwise interfered with.

It will also be seen that the trap is self-sealing by the retention therein of a suitable volume of water which always remains between the inner end of the outlet portion and the lower end of the inlet portion, said volume of water being sufficient to prolong the breaking of the seal by evaporation thereof, and always serving to prevent the escape of foul sewer gas or air into a room to which the fittings are connected and to protect the trap screw and cover from contact therewith.

By the foregoing description it will be readily obvious that I have produced a trap wherein it may be easily and readily installed in a comparatively small space; that it is compact and more economical in its production; that owing to its precise formation at its bottom portion with its widened discharge outlet it is self-cleansing; that its cover may be readily removed; that it provides suitable adjusting means, and that it offers a minimum resistance to the flushing, scouring flow of the waste water.

Having thus described my invention what I claim and desire to secure by Letters Patent is:

1. A sanitary self-sealing and self-cleansing trap of the character described formed from a single piece of metal having an unobstructed interior, an inner vertical wall extending downwardly to a point in horizontal alinement with its outlet portion, an inlet at one side thereof, an outlet at its opposite side, an inwardly sloping formation at opposite sides of its bottom portion terminating with a flat bottom, said bottom being of equal width with the outlet portion and gradually sloping downwardly and outwardly.

2. A trap for bath tubs of the character described formed with an unobstructed interior body portion, an inlet formed at one side thereof, an outlet formed at its opposite side, an inner vertically disposed wall extending downwardly to a point in horizontal alinement with its outlet portion, an inwardly sloping formation at opposite sides of its bottom portion terminating with a flat bottom, said flat bottom being of equal width with the outlet portion, and the outlet being gradually inclined upwardly and inwardly to its discharge end.

3. A trap for bath tubs of the character described having a screw-threaded sealing cover provided with a series of upward extensions formed around its peripheral portion, a screw-threaded opening formed centrally through said cover, an adjustable floor plate provided with a centrally disposed downwardly extended screw-threaded member fitted within and through said opening in the cover, and a series of notched formations extending entirely around the peripheral portion of the said floor plate.

HARRY C. ODENKIRK.